Patented Mar. 16, 1937

2,074,197

UNITED STATES PATENT OFFICE 2,074,197

TEXTILE PRINTING

Alec Wormald, Blackley, Manchester, England, assignor to Imperial Chemical Industries Limited, a corporation of Great Britain No Drawing. Application March 8, 1935, Serial No. 10,123. In Great Britain March 14, 1934

2 Claims. (Cl. 8—5)

According to the present invention I produce white resist styles on textile materials with those sulphuric esters of leuco vat dyes, which have affinity for cotton applying to the material in a suitable manner, e. g. in a printing paste, one or more of the undermentioned inorganic salts, drying and overprinting or padding with one or more of the said esters and developing the colour.

The inorganic salts I use in the invention are those which form an insoluble precipitate with ester salts of leuco vat dyes such as potash alum, aluminium sulphate, chrome alum, iron ammonium alum.

The following examples illustrate, but do not limit the invention, parts being by weight.

*Example 1.*—Cotton material is printed with the following paste:—

|  | Parts |
|---|---|
| British gum (40% solution) | 60 |
| Water | 25 |
| Chrome alum | 15 |
|  | 100 |

The printed material is dried and overprinted with a paste consisting of:

|  | Parts |
|---|---|
| Soledon Brilliant Purple 28 200 paste | 2–10 |
| Water | 27–7 |
| Diethylene glycol | 4–8 |
| Neutral starch tragacanth thickening | 60 |
| Ammonium sulphocyanide solution (1:1) | 2–6 |
| Sodium chlorate solution (10%) | 4–8 |
| Ammonium vanadate solution (1%) | 1 |
|  | 100 |

The overprinted material is dried, steamed for 5–10 minutes, washed well and soaped for 5–10 minutes at the boil.

*Example 2.*—Cotton material is printed with the following paste:—

|  | Parts |
|---|---|
| British gum (40% solution) | 60 |
| Water | 35–25 |
| Iron ammonium alum | 5–15 |
|  | 100 |

The printed and dried material is overprinted with a paste consisting of:—

|  | Parts |
|---|---|
| Soledon Jade Green 500 paste | 2–10 |
| Water | 26–13 |
| Neutral starch tragacanth thickening | 70 |
| Sodium nitrite solution (30%) | 2–7 |
|  | 100 |

The overprinted material is dried and developed by passing through a bath at 60° C. containing 20 parts of sulphuric acid (168° Tw.) per 1000 parts of water, washed well, and soaped at the boil for 5–10 minutes. A passage through hot dilute oxalic acid solution is then given to clear iron stains, if present.

*Example 3.*—Cotton material is printed with the following paste:—

|  | Parts |
|---|---|
| British gum (40% solution) | 60 |
| Water | 25 |
| Potash alum | 15 |
|  | 100 |

The printed and dried material is padded in a solution consisting of:—

|  | Parts |
|---|---|
| Soledon Jade Green 500 paste | 10 |
| Water | 1000 |
| Glycerine | 40 |
| Gum tragacanth (8% solution) | 50 |
| Sodium nitrite solution (30%) | 30 |

The padded material is dried and developed by passing through a bath at 60° C. containing 20 parts of sulphuric acid (168° Tw.) per 1000 parts of water, washed well, and soaped at the boil for 5–10 minutes.

Aluminum sulphate may be used in the above formulas in the preparation of the resist paste in the same proportions as the alums specifically mentioned in those examples.

I claim:

1. Process for the production on cellulosic textile materials of white resist styles with such sulphuric esters of leuco vat dyestuffs as have affinity for cellulosic textile material, which comprises applying to the material a metallic salt which forms an insoluble precipitate with ester salts of leuco vat dyes of the class consisting of aluminum sulphate, potash alum, iron ammonium alum and chrome alum, drying the material, overprinting or padding with the sulphuric ester of the leuco vat dyestuff, and developing the colour.

2. Process as claimed in claim 1 in which the inorganic salt is applied in a printing paste.

ALEC WORMALD.